United States Patent [19]

Hollander

[11] Patent Number: 4,937,429
[45] Date of Patent: Jun. 26, 1990

[54] HEATED HAND GRIPS AND METHOD OF MANUFACTURE

[76] Inventor: James M. Hollander, Main St., Goshen, Mass. 01032

[21] Appl. No.: 229,271

[22] Filed: Aug. 8, 1988

[51] Int. Cl.$^5$ .......................... H05B 3/18; B62D 1/12
[52] U.S. Cl. .................................... 219/204; 219/202; 219/542; 219/546; 219/522; 338/265; 338/268; 338/252; 338/303; 74/551.9
[58] Field of Search .................. 219/200–204, 219/534, 522, 546, 542; 338/264, 265, 252, 266, 267, 302–304; 74/551.9

[56] References Cited

U.S. PATENT DOCUMENTS

| 744,739 | 11/1903 | Fliess . | |
|---|---|---|---|
| 1,492,676 | 5/1924 | Clark | 219/534 |
| 1,830,221 | 11/1931 | Blue . | |
| 2,379,530 | 7/1945 | Lederer | 338/303 |
| 2,794,504 | 6/1957 | Carpenter | 338/303 |
| 4,471,209 | 9/1984 | Hollander | 219/204 |
| 4,598,192 | 7/1986 | Garrett | 219/204 |

FOREIGN PATENT DOCUMENTS

| 2254204 | 8/1975 | France | 219/204 |
|---|---|---|---|
| 0510625 | 1/1955 | Italy | 219/204 |
| 0571069 | 8/1945 | United Kingdom | 219/204 |
| 2030829 | 4/1980 | United Kingdom | 219/204 |

Primary Examiner—M. H. Paschall
Attorney, Agent, or Firm—Bachman & LaPointe

[57] ABSTRACT

A heated hand grip is disclosed having an internal sleeve and an external protective jacket where the sleeve is formed with external, helical lands and grooves about which a strand of resistance wire is sewed and anchored snugly. The disclosure includes a method of manufacturing the heated hand grip.

6 Claims, 1 Drawing Sheet

HEATED HAND GRIPS AND METHOD OF MANUFACTURE

BACKGROUND OF THE INVENTION

The present invention relates to hand grips, in particular, to hand grips that are utilized on handle bars or rudders of vehicles such as snow plows, ice boats, bicycles, motorcycles, ski mobiles and the like.

In particular, the invention relates to a heated hand grip of the above class, useful when such vehicles are operated in exposed winter atmospheres in which cold ambient temperatures are made more uncomfortable by wind chill developed as the vehicles progress at high speeds.

Representative examples of prior art heated hand grips are disclosed and described in U.S. Pat. Nos. 744,739, issued Nov. 24, 1903, by Fliess; and 1,830,221, issued Nov. 3, 1931, by Blue.

A particular prior art electrically heated hand grip, over which the present is an improvement, is disclosed and described in my prior U.S. Pat. No. 4,471,209, issued to me on Sept. 11, 1984, entitled ELECTRICALLY HEATED HAND GRIPS FOR VEHICLE HANDLE BARS.

In the '209 reference, which has enjoyed commercial success, there are several manufacturing and quality problems, which the present invention overcomes. For example, in the '209 device the heating wires are wound initially as a loose, fragile coil; thereafter the coil is placed on a metal mold core. The core is then inserted into a mating mold cavity and the internal sleeve 6, disclosed in FIGS. 2 and 4 of the '209 patent, is molded with the fragile coil of heating wire 10 being a mold insert.

In this procedure, there is danger of electrically short circuiting because the individual coils may be misplaced prior to mold closure.

To overcome this problem, the heating wire of the '209 disclosure was coated, prior to insertion into the mold, with high temperature insulating enamel.

After molding the internal sleeve, it was then necessary to remove the insulation at the terminal ends of the insulating wires to ensure good, reliable electrical conductivity when the wire ends were spliced to leads supplying electrical energy to the coil.

The structure and method of manufacture of the heated hand grips of the '209 reference had a further disadvantage and limitation. If one wished to change wire gauge or wire size, it was necessary to retool the male or female portions of the mold to accommodate new wire dimensions.

In addition, the manual steps required in winding the coils of heating wire and placing the winding about the mold core is tedious and highly labor intensive.

In like manner, the steps of exposing the terminal ends of the heating wire and removing the enamel insulation was highly labor intensive and time consuming.

SUMMARY OF THE INVENTION

Therefore, it is a primary feature of the present invention to provide an improved electrically heated hand grip including an improved method of manufacture of such a hand grip.

A further feature of the invention is the provision of an inner or internal sleeve for an electrically heated hand grip where the sleeve is molded free of mold inserts and the exterior surface of the sleeve defines a helical confirmation.

A further feature of the invention is the provision of an exterior surface on the inner sleeve defining at least two lands and two grooves each extending from end to end of the sleeve in helical fashion.

A further feature of the invention is that the design of the land and groove cross-section of the internal sleeve is such that a wide variety of wires of various gauges and constructions can be used without having to retool the sleeve mold elements, as was the case with the prior art grip.

A further feature of the invention is the provision of a novel method of winding an electrical resistance heating wire of, solid, stranded or braided configuration, about said sleeve where the resistance wire is disposed within and follows along the helical contour of grooves that are formed alternately between helical lands.

A further feature of the invention is the provision of an anchor means or pin at one end of the inner sleeve so that a length of heating wire may be looped about said pin defining a U-shape or return bend with wire legs extending from the pin being disposed within and extending along individual helical grooves running out at the opposite end of the sleeve.

A further feature of the invention is the provision of a second anchor means at the opposite end of the sleeve whereby individual legs of the looped wire are wrapped about mating lugs tensioning the legs and ensuring the placement of the wire without any risk of subsequent movement or contact between wire legs during succeeding operations in completing the manufacture of the grip.

A further feature of the invention is the provision of the land and groove confirmation so that a wide variety of wires of wire gauges ranging from 15 ga. to 30 ga. and of various construction, such as tinsel, solid, stranded, braided or woven wires may be utilized without having to modify the sleeve mold tooling configuration.

A further feature of the invention is that the heating wire need not be coated or insulated in any manner thereby precluding the need to remove insulation to ensure electrical conductivity when wire ends are spliced to leads connected to a source of energy.

A still further feature of the invention is that since the heating wire is served upon the helical groove after the manufacture (molding) of the sleeve there is no danger of a short circuit resulting from operator error in positioning the heating wire about a mold core (as a mold insert) as was the case during manufacture of the grip described in the '209 patent.

Obviously, contact between legs or coils of the heating wire produces an electrical short circuit thereby rendering the product defective with higher heat output than intended.

Therefore, it is emphasized that among the primary features of the present invention is (1) the design of the inner sleeve facilitating use of a wide variety of heating wire structures and configurations without having to resort to new tooling and (2) the novel method of placing wire along the helical grooves with appropriate anchors at each end of the sleeve thereby ensuring proper placement of the heating wire with virtually no risk of distortion or short circuiting during the application of the outer protective sheath.

A heated hand grip embracing certain principles of the invention may comprise a molded inner sleeve, a molded outer protective sheath, the exterior surface of said sleeve being formed with at least two lands and two grooves, each land and each groove defining a helix, an anchor means formed at one end of said sleeve, terminal means formed at the opposite end of said sleeve, and a resistance heating wire looped about said anchor means and extending along and disposed within said helical grooves, said resistance wire terminating at said terminal means.

A method embracing certain other principles of the invention practiced to produce a hand grip may comprise the steps of molding a tubular sleeve having an external surface defining a pair of helical lands and a pair of helical grooves, providing a strand of resistance heating wire, forming the wire into a return bend to define two spaced legs, placing the legs of the heating wire in adjacent grooves so that the legs extend from said one end to the opposite end of the sleeve whereby the legs follow the helical path of said helical grooves, anchoring the wire so placed permanently, and placing a protective sheath over said sleeve and said wire.

Other features and advantages of the present invention will become more apparent from an examination of the succeeding specification when read in conjunction with the appended drawings in which:

DETAILED DESCRIPTION OF THE INVENTION

Figure 1:
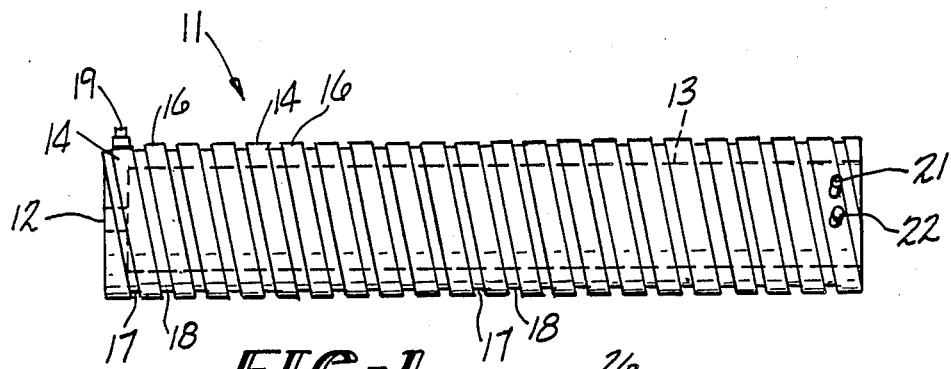
FIG. 1 is a side view of the molded inner sleeve.

In FIG. 1, the reference numeral 11 designates a molded sleeve 12 having a central hollow core 13 and helical lands 14 and 16 with intervening grooves 17 and 18 formed on the periphery of the sleeve.

The sleeve, molded as a one-piece unit in usual and customary molding equipment, is fabricated from suitable elastomer or thermoplastic materials compounded and plastisized to develop proper thermal, mechanical, weathering and flexibility properties.

The lands 14 and 16 in effect, a double "thread" are straddled by intervening double "roots" or grooves 17 and 18.

One land or thread 14 is formed (molded) with first anchor means or pin 19 in seamless fashion and the opposite end of the land 14 is formed, in similar manner, with a second anchor means defining a pair of spaced lugs 21 and 22.

Figure 3:
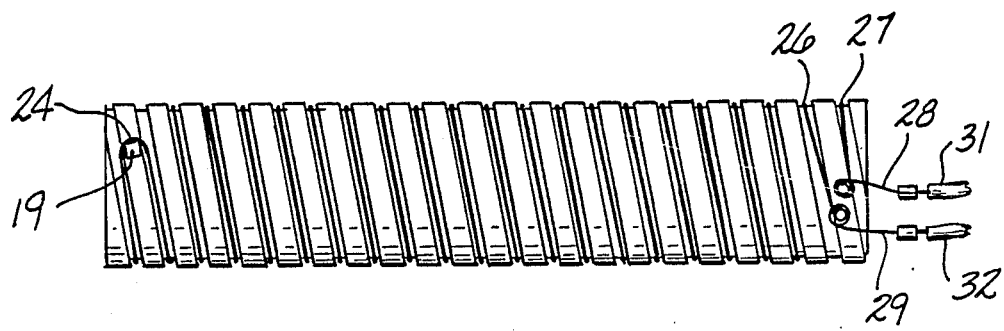
FIG. 3 shows the resistance wire fully in place and anchored at both ends of the sleeve; and, FIG. 4 shows the completed hand grip with a portion of the outer sheath broken away for clarity.
Figure 4:
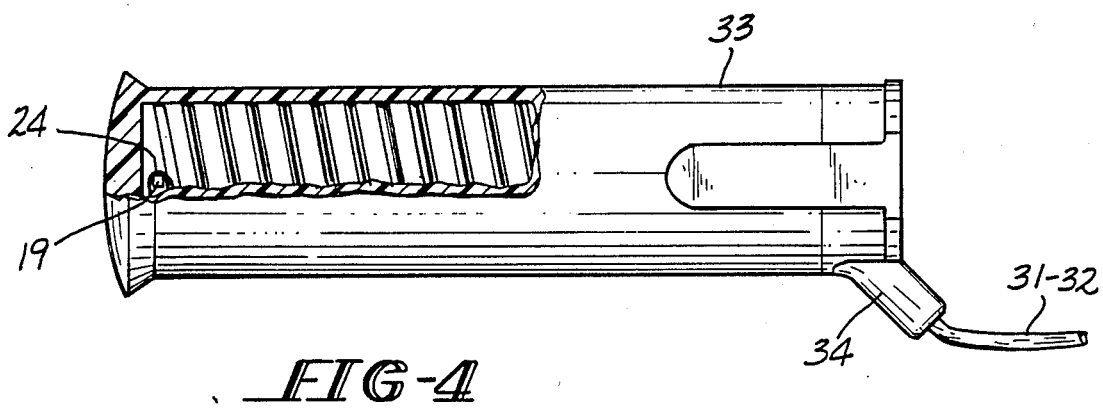

A length or strand of resistance wire 23 formed into a U-shape having a return bend at 24 is looped about the pin 19 and wire legs 26 and 27 are placed in grooves 17 and 18, respectively, and the legs are served or wound tightly about the sleeve within the grooves "running out" at the right end of the sleeve as indicated by the reference numeral 28 in FIG. 3.

The ends 29 and 28 of the respective legs 26 and 27 are secured or anchored by taking a turn or two about lugs 21 and 22 with the bitter ends 28 and 29 exposed for splicing to lead wires 31 and 32.

Figure 2:
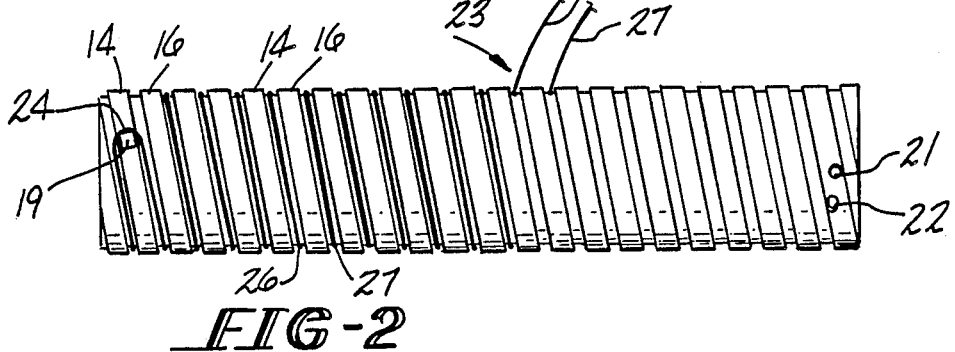
FIG. 2 is similar to FIG. 1 showing steps of looping and placement of the resistance wire.

After the serving and anchoring step, exemplified in FIGS. 2 and 3 and with the wire 23 appropriately tensioned, a protective jacket 33 is molded over the wired sleeve. In this molding process, thermal fusion between the inner sleeve and protective jacket provides a permanent bond, locking all wires securely in position.

A boss 34 is molded integrally with the protective jacket to protect the splice between the resistance wire and the lead wires.

Again, it is noted that the present grip device and its method of manufacture improves quality, reduces labor and lends itself to a wide variety of resistance wire sizes, cross-sectional shapes and strand, which prior art devices do not offer.

It is to be understood that the invention is not limited to the illustrations described and shown herein, which are deemed to be merely illustrative of the best modes of carrying out the invention, and which are susceptible of modification of form, size, arrangement of parts and details of Operation. The invention rather is intended to encompass all such modifications which are within its spirit and scope as defined by the claims.

What is claimed is:

1. An electrically heated hand grip comprising:
   a molded inner sleeve,
   a molded outer protective sheath,
   the exterior surface of said sleeve being formed with at least two lands and two grooves, each land and each groove defining a helix,
   an anchor means defining a pin formed at one end of said sleeve and molded integrally an seamless fashion with said sleeve,
   terminal means defining a pair of spaced lugs formed at the opposite end of said sleeve and molded integrally in seamless fashion with said sleeve, and
   a length of uncoiled resistance heating wire disposed between the sleeve and the sheath looped about said anchor means and having legs extending along and disposed within said helical grooves,
   end portions of said legs terminating at and secured to said terminal means whereby said legs are tensioned so as to be fixed in said grooves separately and individually thereby precluding contact between legs.

2. The hand grip of claim 1 in which the anchor means and the terminal means are both molded integrally with the same land in seamless fashion.

3. The hand grip of claim 1 in which the heating wire defines a U-shaped strand or filament, each leg of said strand having an end portion and being individual to one of said grooves.

4. The hand grip of claim 3 in which the end portion of each leg is wound about a mating lug individually.

5. The hand grip of claim 4 in which the ends of the legs are connected individually to mating insulated lead wires.

6. The hand grip of claim 1 in which the heating wire is bare and free of coatings.

* * * * *